May 26, 1942.  L. C. DOANE  2,284,046
FLUORESCENT LAMP
Filed Nov. 21, 1939
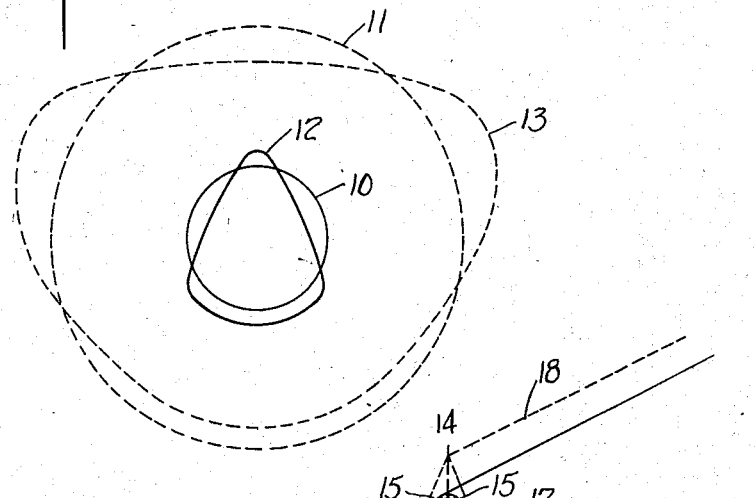
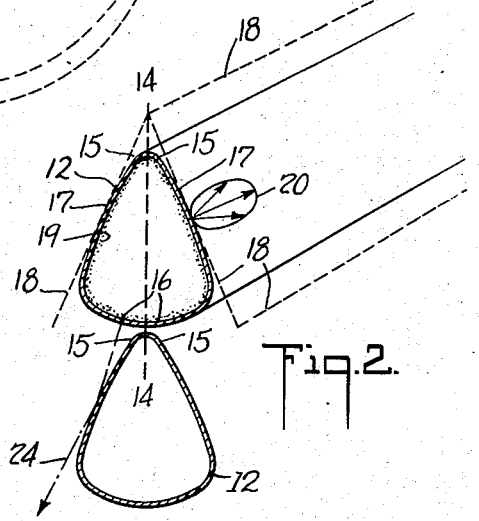
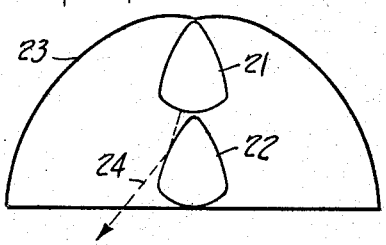
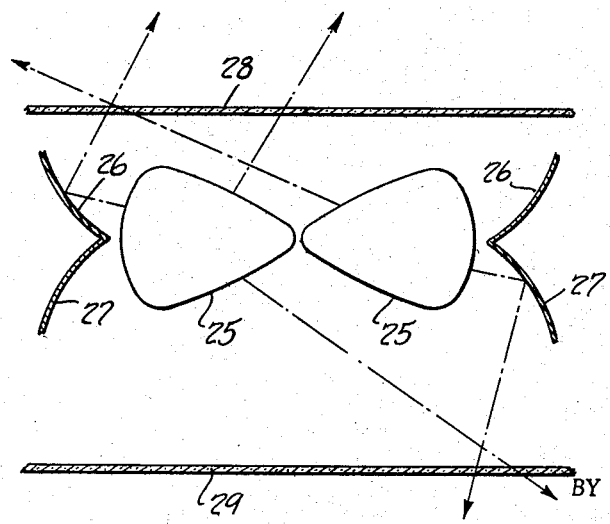
INVENTOR.
Leroy C. Doane
Joel B. Lieberman
ATTORNEY.

Patented May 26, 1942

2,284,046

UNITED STATES PATENT OFFICE 2,284,046

FLUORESCENT LAMP

Leroy C. Doane, Meriden, Conn., assignor to The Doane Products Corporation, Meriden, Conn., a corporation of Connecticut Application November 21, 1939, Serial No. 305,440

3 Claims. (Cl. 176—122)

The present invention relates to fluorescent lamps, and is more particularly directed toward fluorescent lamps of a contour to provide a natural asymmetric distribution of light and to reduce the light losses when two lamps are brought close together as compared with the losses which occur with conventional cylindrical fluorescent lamps.

Tubular fluorescent lamps heretofore available for use in lighting have been in the form of straight cylinders of circular cross section. The envelope is made of glass and its inner surface is coated with suitable material which fluoresces and reradiates visible light when subjected to ultra-violet light generated interiorly. These tubes are opaque to extrinsic light.

As the fluorescent tubes in common use are symmetrical about the longitudinal axis the illumination produced is symmetrical with respect to this axis. As the tubes are opaque more or less light is lost whenever a tube is mounted near enough a reflector to trap light, or whenever a tube is mounted near enough another similar tube to interfere with the escape of the light rays. With the cylindrical tubes the losses become very substantial where the tubes are mounted close together in a reflector in positions in which each tube blocks out some of the reflected light originating in the other tube.

In my copending application entitled Luminaire for multiple fluorescent lamps, Serial No. 305,439, filed November 21, 1939, executed and filed concurrently herewith, I have discussed the design of luminaires with multiple tubes and have pointed out the advantages of certain arrangements of the form of tube set forth herein in reflectors for direct lighting. The present invention relates to fluorescent lamps of novel contour adapted for use alone and for use in luminaires including those of the type particularly discussed in the application just referred to.

The accompanying drawing shows the conventional fluorescent lamp and its distribution, together with the new shaped lamp with its distribution and diagrammatically shows luminaires in which two of them may be employed.

In the drawing:

Figure 1 diagrammatically shows a fluorescent lamp of conventional shape and a lamp of altered cross section, also the photometric curves of the two lamps;

Figure 2 is a perspective view illustrating the new shape of the tube, and

Figures 3 and 4 are diagrammatic illustrations showing the use of the new tubes in luminaires.

A fluorescent tube of conventional cylindrical form is shown at 10 in Figure 1. It has, as shown by the dotted circle 11, a symmetric distribution about its longitudinal axis. The new form of tube 12 has an altered cross section which, as explained below, provides an asymmetric distribution of light as illustrated by the curve 13.

The tube 12 shown more in detail in Figure 2 is of uniform cross section and of substantial length, as is the practice in making fluorescent tubes. Instead of being of cylindrical cross section it is now in the form of an envelope symmetrical with respect to a vertical median plane 14 and having a contour each side of this plane which includes a short radius arcuate portion 15, a long radius arcuate portion 16, and an interconnecting curved portion 17. The entire contour provides a smooth outer surface. The curved portions 17, 17 are rather flat and may be deemed to lie substantially in the faces of a dihedral plane whose sides are indicated by dot-and-dash lines at 18, 18. The curved portions 17—17 are generally at right angles to the curved portions 16—16.

When the luminous flux which is generated in the coating 19 inside the tube is radiated from the tube, the maximum intensity of the light from any point on the surface is normal to the surface at that point shown by the typical distribution curve 20. This curve will depart slightly from a circle depending upon the characteristics of the tube. Owing to the shape of the tube more light is sent out obliquely upwardly from the tube than is sent directly up or down and this brings about the asymmetric distribution illustrated in Figure 1.

Where two tubes are to be used in a reflector, designed for direct lighting only, the tubes may be placed close together as illustrated at 21 and 22 in Figure 3. The narrow part of the upper tube is close to the reflector 23 and the narrow part of the lower tube is close to the wide part of upper tube. Owing to the shape of the tubes the oblique walls of the lower tube receive the dominant light rays from the lower part of the upper tube at angles such that skin reflection occurs (as indicated at 24) thereby avoiding absorption losses. With this arrangement there is considerable reduction in the amount of light trapped between the upper tube and reflector and between the two tubes so that the overall efficiency of the fixture may be higher than that using the round tubes similarly disposed. This arrangement is discussed in detail in the application above referred to.

The new form of tubes also is well adapted for use in fluorescent lighting fixtures where both direct and indirect lighting are desired. Two horizontally extending tubes 25, 25 are mounted so that the narrow parts are close together. The wide parts of the tube are placed adjacent upwardly acting reflectors 26, 26 and downwardly acting reflectors 27, 27. The top of the fixture may be closed with a cover 28 and the bottom has a closure 29. Substantially all the light emitted by the tubes will be emitted in useful directions approximately one-half for direct lighting and one-half for semi-indirect lighting. The amount may be adjusted by varying the mounting height of the tubes relative to the reflectors. With these arrangements the light lost between the tubes themselves and the tubes and reflectors is very small.

What is claimed is:

1. A fluorescent lamp having a transparent envelope provided with an inside coating of fluorescent material, the envelope being symmetrical about a median plane and having a cross section which provides substantial areas oblique to and converging toward said median plane, whereby the lamp has an asymmetric distribution of light with respect to the longitudinal axis through said plane with the regions of maximum light flux in directions substantially normal to said oblique areas.

2. A fluorescent lamp symmetrical about a median plane and having a contour each side of said plane which includes a short radius arc and a long radius arc, the arcs being concave toward one another and having their centers substantially in said plane, and an interconnecting curve the dominant portion of which converges toward said plane.

3. A fluorescent lamp such as claimed in claim 2, wherein the long radius arc is at substantially right angles to the interconnecting curve on the same side of the median plane.

LEROY C. DOANE.